Nov. 4, 1930.  S. PAUL  1,780,717
VEHICLE BODY CONSTRUCTION
Filed Nov. 2, 1928
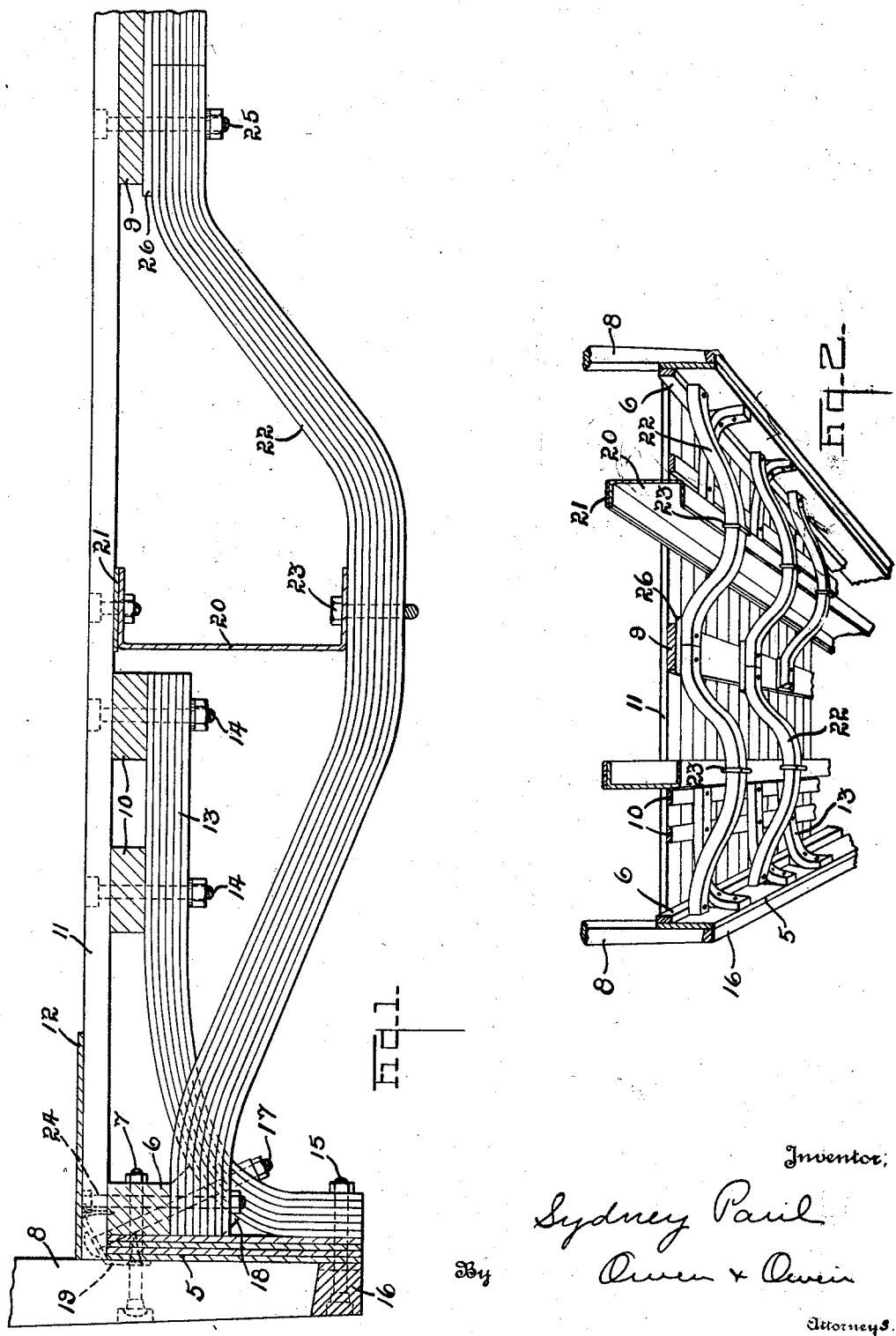
Inventor;
Sydney Paul
By Owen & Owen
Attorneys.

Patented Nov. 4, 1930

1,780,717

UNITED STATES PATENT OFFICE

SYDNEY PAUL, OF LIMA, OHIO, ASSIGNOR TO SUPERIOR BODY COMPANY, OF LIMA, OHIO, A CORPORATION OF OHIO

VEHICLE BODY CONSTRUCTION

Application filed November 2, 1928. Serial No. 316,660.

This invention relates to a vehicle body construction which is especially adapted to be used for motor busses and other vehicles having large bodies.

The general object of the invention is to provide a body construction which is strongly and rigidly braced, yet comparatively simple and inexpensive. It is preferred to construct the body mainly of wood, although such material is not essential to the invention. A further object is to arrange the sills, braces and outrigger construction in such a manner as to bring the center of gravity of the body as low as possible, so that it cannot be easily overturned.

The specific construction of my invention and the advantages resulting therefrom will be more particularly described with reference to the accompanying drawings which illustrate the preferred embodiment thereof.

In the drawings:

Figure 1 is a transverse sectional view of a portion of a body constructed according to the invention.

Figure 2 is a perspective view of a portion of the body as viewed from a point below and in front of the same.

According to the construction shown in the drawings, the bottom portion of the vehicle body has longitudinal side sills 5, which are preferably of wood and made up of laminations. These laminations may be bent to conform to the desired contour of the body, and after they are glued together and the glue becomes dry, the sills will retain their shape. At the upper edge of each side sill 5 a sub-sill 6 is secured to the inner face thereof by bolts 7, which also aid in securing vertical pillars 8 to the outer face of the sills. The bottom frame construction also has intermediate sub-sills 9 and 10. The floor 11 is laid on the sub-sills 6, 9 and 10 and is preferably overlaid with a suitable covering 12.

Outriggers 13 are secured to the under faces of the sub-sills 10 at each side of the body by means of suitable bolts 14. These outriggers also are preferably of laminated construction, formed by the same method as the side sills 5. Their outer ends are gradually curved downwardly, finally terminating in vertical portions which lie flat against the lower edge portions of side sills 5, to which they are secured by suitable bolts 15. The bolts 15 also serve to secure the bottom side sill 16 to the outer face of side sill 5 at the lower edge thereof.

In order to strengthen the construction, the bowed portion of each outrigger 13 is rigidly secured directly to the meeting edges of the side sill 5 and floor 11 by a suitable bolt 17 or the like. This bolt, as shown in Figure 1, extends diagonally through the sub-sill 6 and through a spacing block 18 which is of suitable shape to fit in the space between the convex face of the outrigger and the opposed faces of the side sills 5 and sub-sill 6 respectively. The head of the bolt 17 engages a plate 19 which fits over and is secured to the adjacent portions of the sill 5 and floor 11 respectively.

In assembling the vehicle, the body is laid upon longitudinal beams 20 of the chassis and the floor 11 is directly bolted thereto. Fibre strips 21 are preferably inserted between the floor and the beams 20 to prevent squeaks.

Curved cross braces or struts 22 are used for supporting and bracing the outer portions of the body, which include the side sills 5. These struts or braces 22 are also preferably laminated and constructed according to the same method as the side sills 5 and outriggers 13. Each strut or brace 22 extends from the side sill 5 to the central sub-sill 9 and the intermediate and lowermost portion is secured to the underside of the beam 20 by U-bolt 23 or the like. The end portions of each strut or brace 22 are secured by bolts 24 and 25 to the sub-sills 6 and 9 respectively. A fibre strip 26 may be inserted between the sub-sill 9 and the adjacent portions of the braces 22. In fact, fibre strips should be used between all contacting surfaces which might otherwise cause annoying squeaks.

By the construction above described, the vehicle body is brought down as low as possible with respect to the supporting beams 20 of the chassis. The sills 5 are held rigidly in their relation to the bottom of the body by a strongly braced construction which includes the outriggers 13. Sagging of the sills 5 is positively prevented by thrust effected by the struts or braces 22 so that the entire body is supported directly from the beams 20 without any bending strain on any of the elements which make up the construction. At the same time the elements which take the thrust represent an underslung construction which results in an unusually low center of gravity, which is the most essential condition in the construction of vehicles designed to carry a heavy load, in order to prevent the possibility of overturning.

While I have shown and described in detail the preferred construction of the invention, it is to be understood that the same may be modified to a considerable extent without any material departure from the scope of the invention as defined in the claims.

What I claim is:

1. In a vehicle body construction, the combination of longitudinal side sills, intermediate sub-sills, a floor laid thereon, outriggers connecting the side sills to the sub-sills and rigidly secured thereto, and struts with their outer ends abutting against the inner faces of the respective side sills to prevent the latter from sagging.

2. In a vehicle body construction, the combination of a side sill, a sub-sill between the side sill and the longitudinal center line of the vehicle, outriggers connecting the sub-sill to the side sill and rigidly secured to both, and a strut with its outer end abutting against the inner face of the side sill.

3. In a vehicle body construction, the combination of a side sill, sub-sills between the side sill and the longitudinal center line of the vehicle, outriggers secured against the bottoms of said sub-sills, the outer ends of said outriggers being curved downwardly to lie flat against the lower portion of the side sill and secured thereto, and struts extending upwardly and outwardly with their outer ends bearing against the inner face of the side sill.

4. In a vehicle body construction, the combination of a side sill, sub-sills between the side sill and the longitudinal center line of the vehicle, a floor laid on said sills, outriggers secured against the bottoms of said sub-sills, the outer ends of said outriggers being curved downwardly to lie flat against the lower portion of the side sill and secured thereto, means rigidly connecting the bowed portions of the outriggers directly to the meeting portions of the floor and side sill to form a trussed construction, and struts extending upwardly and outwardly with their outer ends bearing against the inner face of the side sill.

5. In a vehicle of the character described, the combination with longitudinal beams of a chassis, of longitudinal side sills, intermediate sub-sills, a floor laid on said beams and sills, and struts secured beneath said beams and extending upwardly and outwardly with their outer ends bearing against the inner faces of the side sills.

6. In a vehicle of the character described, the combination with longitudinal beams of a chassis, of longitudinal side sills, intermediate sub-sills, a floor laid on said beams and sills, outriggers connecting the side sills to the sub-sills and rigidly secured thereto, and struts intermediately secured beneath said beams with their outer ends abutting against the inner faces of the respective side sills to prevent the latter from sagging.

7. In a vehicle of the character described, the combination with a longitudinal beam, of a side sill, a sub-sill between said beam and side sill, outriggers connecting said sub-sill to said side sill and rigidly secured to both, and a strut secured beneath said beam with its end abutting against the inner face of the side sill.

8. In a vehicle of the character described, the combination with longitudinal beams of a chassis, of side sills, sub-sills between each side sill and the longitudinal center line of the vehicle, outriggers secured against the bottoms of said sub-sills, the outer end of each outrigger being curved downwardly to lie flat against the lower portion of the respective side sill and secured thereto, and struts intermediately secured to the respective beams and each extending upwardly and outwardly with its outer end bearing against the inner face of the respective side sill.

9. In a vehicle of the character described, the combination with longitudinal beams of a chassis, of longitudinal side sills, sub-sills between each side sill and the longitudinal center line of the vehicle, a floor laid on said sills, outriggers secured against the bottoms of the respective sub-sills, the outer end of each outrigger being curved downwardly to lie flat against the lower portion of the respective side sill and secured thereto, means rigidly connecting the bowed portions of the outriggers directly to the meeting portions of the floor and the respective side sills to form a trussed construction, and struts intermediately secured beneath the respective beams and curved upwardly at each side thereof, said struts at their outer ends extending upwardly and outwardly and bearing against the inner faces of the respective side sills.

10. The combination with a chassis frame having longitudinal beams, of a body frame resting on the chassis frame and having side sills, and reinforcing members secured beneath said beams and extending upwardly and outwardly therefrom with their outer ends abutting against the inside faces of the side sills.

11. The combination with a chassis frame having longitudinal beams, of a body frame resting on the chassis frame and having side sills, and reinforcing members extending beneath and secured to the bottom faces of each of said beams and curving upwardly, and engaging the body frame in supporting relation thereto both between the beams and at the outer sides thereof.

12. In a vehicle body construction, a frame having longitudinal side sills, intermediate frame members, and bracing members having horizontal portions secured to said intermediate members, and curving thence downwardly and terminating in end portions which have substantially vertical lateral faces bearing against the lower portions of the inner faces of the respective side sills.

13. In a vehicle body construction, a frame having longitudinal side sills, an intermediate frame member, and bracing members each having at one end a horizontal portion secured to the intermediate frame member and having at the other end a vertical lateral face lying flat against a vertical face of one of the sills and secured thereto.

In testimony whereof I have hereunto signed my name to this specification.

SYDNEY PAUL.